United States Patent [19]

Saito

[11] Patent Number: 5,012,373
[45] Date of Patent: Apr. 30, 1991

[54] APPARATUS FOR POSITIONING A MAGNETIC HEAD ON A HEAD DRUM

[75] Inventor: Etsuro Saito, Kanagawa, Japan

[73] Assignee: Sony Corporation, Tokyo, Japan

[21] Appl. No.: 287,393

[22] Filed: Dec. 20, 1988

[30] Foreign Application Priority Data

Dec. 24, 1987 [JP] Japan ................................. 62-327782

[51] Int. Cl.⁵ ................................................. G11B 5/52
[52] U.S. Cl. ................................. 360/107; 360/77.16; 360/78.02
[58] Field of Search ................. 360/84, 104, 106, 107, 360/109, 78.02, 130.24, 77.01, 77.16, 78.05, 78.12, 77.02, 77.13

[56] References Cited

U.S. PATENT DOCUMENTS

| | | | |
|---|---|---|---|
| 4,212,043 | 7/1980 | Baker | 360/109 X |
| 4,363,046 | 12/1982 | Saito | 360/107 X |
| 4,695,907 | 9/1987 | Inaji et al. | 360/107 |
| 4,939,607 | 7/1990 | Saito | 360/107 |

FOREIGN PATENT DOCUMENTS 0015867  4/1971  Japan ..................................... 360/109

OTHER PUBLICATIONS

IBM Technical Disclosure Bulletin, vol. 12, No. 1, Jun. 1969, Price, Video Tape Recorder with Oscillating Head.

Primary Examiner—Robert S. Tupper
Assistant Examiner—Andrew L. Sniezek
Attorney, Agent, or Firm—Alvin Sinderbrand; William S. Frommer

[57] ABSTRACT

A tape guide drum rotatable about its central axis is provided with a rotary head device including a head support which is flexible, at least in part, and extends radially in respect to such axis from a fixed inner portion to a radially outer portion at which one or more magnetic heads are mounted for movements therewith in directions substantially parallel with the central axis upon flexing of the head support at the flexible parts thereof, a rotary motor having a motor shaft rotatable about an axis extending radially in respect to the axis of the drum, a thrust bearing for absorbing an axial thrust of the motor shaft generated centrifugally in response to rotation of the drum, and a flexible metal belt having an intermediate loop wound about and coupled to the shaft and opposite ends fixed to the radially outer portion of the head support for converting rotation of the motor shaft into the movements of the magnetic head or heads parallel to the drum axis.

10 Claims, 4 Drawing Sheets

APPARATUS FOR POSITIONING A MAGNETIC HEAD ON A HEAD DRUM

BACKGROUND OF THE INVENTION

1. Field of the Invention

This invention relates generally to a rotary head device for mounting on a tape guide drum, and more particularly is directed to a rotary head device of the type that is capable of displacing a magnetic head or heads transversely in respect to recording tracks being scanned thereby in a magnetic recording and reproducing apparatus, such as, a video tape recorder, which is hereinafter referred to as a VTR.

2. Description Of The Prior Art

In existing VTRs of the helical scan type, a magnetic recording tape is wrapped helically about the peripheral surface of a cylindrical tape guide drum, and magnetic heads are rotated about the axis of the drum so as to scan recording tracks extending obliquely across the tape. During normal or standard recording operations, the magnetic recording tape is longitudinally advanced at a predetermined or standard tape running speed so that the rotary heads scan and record video signals in successive oblique recording tracks on the tape during successive revolutions of the heads. During normal reproducing or playback operations, the standard tape running speed is again employed and a servo control ensures that each rotary head precisely traces, and reproduces the video signal recorded in one of the recording tracks during each scanning of the tape by such head. However, during slow-motion or fast-motion playback operations, the tape running speed is either reduced or increased in respect to the standard tape running speed with the result that the scanning path or trace of each rotary head across the tape is angularly displaced from the recording track to be scanned. Further, irregularities in the rotation of the magnetic head or heads produce so-called jitters which generate a noise band on the display screen.

In order to compensate for deviations of the trace or scanning path of a rotary magnetic head from the recording track being scanned during slow-motion or fast-motion playback, rotary head devices have been provided to automatically displace a magnetic head transversely in respect to the recording track being scanned so as to ensure the precisely correct tracing of the recording track from one end to the other. Such known rotary head devices are generally of two types, namely, the so-called bimorph leaf type, and the moving-coil or electromagnetic type, respectively.

In the known rotary head devices of the bimorph leaf type, a bimorph piezoelectric or magnetically operated bending or pivoting leaf member is anchored, at one end, in respect to the tape guide drum and supports a magnetic head assembly at its free end so that the magnetic head is displaced, desirably in the direction extending transversely in respect to the recording track, in response to the application of a control voltage to the bimorph plate or leaf member. Such control voltage is generated so as to maintain the magnetic head in accurate scanning relation to the recording track being traversed thereby during the various different playback modes, that is, during normal playback as well as during slow-motion or fast-motion playback.

The rotary head devices of the bimorph leaf type have certain functional disadvantages that limit the use thereof in so-called professional VTRs and in digital VTRs which require relatively large displacements of the movably supported magnetic head or heads. In this respect, it is to be noted that the displacement of a magnetic head supported by a bimorph leaf member is inherently limited. If the length of the bimorph leaf member is increased in order to increase the maximum displacements of the magnetic head mounted at the free end of the leaf member, the frequency characteristic of the head mounting becomes undesirable. Further, increasing the displacement of the magnetic head supported by the bimorph leaf member reduces the useful life of the rotary head device as cracks develop in the bimorph material. Rotary head devices of the bimorph leaf type are also subject to hysteresis or drift, and thereby are difficult to control, particularly if the movably mounted magnetic head is used for recording as well as for playback. When rotary head devices of the bimorph leaf type have been designed to provide the relatively large displacements required for use in professional VTRs, a pair of bimorph leaves disposed in substantially parallel, spaced apart relationship have been employed for supporting a magnetic head or heads, for example, as in U.S. Pat. No. 4,441,128, issued Apr. 3, 1984, and having a common assignee herewith. However, such rotary head devices employing a pair of bimorph leaves are expensive, in part, due to the cost of providing the long bimorph leaves required for obtaining the desired large head displacements. Finally, rotary head devices of the bimorph leaf type are disadvantageous in that they require the application of high control voltages thereto for effecting the desired displacements of the movably supported heads.

Rotary head devices of the moving coil type have been proposed, for example, as disclosed in U.S. Pat. No. 4,212,043, issued July 8, 1980, in which a pair of substantially parallel, spaced apart leaf members which are flexible, at least in part, are fixed, at one end, to the rotary tape guide drum and are connected, at their other ends, to form a flexibly hinged parallel linkage assembly on which a magnetic head assembly is mounted for the desired displacements thereof upon angular displacements of the respective flexibly hinged parallel-linkage assembly. In such rotary head devices of the moving coil type, an electrical voice coil is mounted on the flexibly hinged parallel-linkage assembly to act as the movable element of a linear motor which further includes a permanent stator magnet fixed to the rotating drum so that, when suitably generated reversible currents of varying magnitudes are suitably supplied to the voice coil, the latter is electro-magnetically displaced relative to the stator magnetic in directions parallel to the drum axis for causing corresponding displacements of the magnetic head assembly. The foregoing known rotary head devices of the moving coil type are disadvantageous in that a shield must be provided for ensuring that the magnetic fields of the stator magnet and of the moving voice coil will not influence the magnetic head or heads and thereby interfere with the recording and reproducing functions. Since a linear motor is employed, providing a relatively large displacement of the movably supported head assembly requires a correspondingly large shield structure. Further, in the described rotary head devices of the moving coil type, since the direction of movement of the moving voice coil is parallel to the axis of rotation of the tape guide drum, centrifugal forces due to rotation of the drum act laterally on the voice coil and would strongly resist deflection of the flexibly hinged parallel-linkage assembly if the leaf members of the latter extended radially in respect to the axis of rotation of the drum. The centrifugal forces acting laterally on the voice coil also can disturb the desired precise positioning of the voice coil relative to the stator magnet and the tubular pole pieces associated therewith. Furthermore, the voice coil, in being directly connected with the flexibly hinged parallel-linkage assembly increases the mass of the structure being displaced with the magnetic head assembly and thereby interferes with the attainment of a desirable frequency characteristic.

OBJECTS AND SUMMARY OF THE INVENTION

Accordingly, it is an object of this invention to provide a rotary head device for supporting a magnetic head or heads on a rotary tape guide drum and for effecting displacement of such head or heads in directions parallel to the axis of rotation of the drum in a manner to avoid the above mentioned disadvantages of the prior art.

More specifically, it is an object of this invention to provide a rotary head device, as aforesaid, which is capable of effecting relatively large displacements of the mounted magnetic head or heads so as to be adapted for inclusion in professional use or digital VTRs.

Another object of this invention is to provide a rotary head device, as aforesaid, which, while enabling relatively large displacements of the mounted head or heads, provides a desirable frequency characteristic.

Still another object of this invention is to provice a rotary head device, as aforesaid, which avoids the necessity of providing relatively large shielding members for isolating the magnetic head or heads from magnetic fields employed in displacing the head or heads.

A further object of this invention is to provide a rotary head device, as aforesaid, in which the drive mechanism employed for effecting displacements of the magnetic head or heads is arranged so that centrifugal forces acting on the drive mechanism in response to rotation of the tape guide drum do not interfere with the reliable displacement of the head or heads.

In accordance with an aspect of this invention, a rotary head device on a tape guide drum rotatable about its central axis comprises head support means which is flexible, at least in part, and which extends substantially radially in respect to the central axis of the drum from a radially inner portion of the head support means fixedly mounted on the drum to a radially outer portion of the head support means movable in directions substantially parallel to the central axis with flexing of each flexible part of the head support means, magnetic head means mounted on the radially outer portion of the head support means for movements therewith in the directions substantially parallel with the central axis of the drum, rotary motor means including a drive element or motor shaft rotatable in response to a control signal applied to the rotary motor means, and means for converting rotation of the motor shaft into the desired movements of the magnetic head means with the radially outer portion of the head support means.

In accordance with a feature of this invention, the rotary motor means has the axis of rotation of its shaft extending radially in respect to the central axis of the drum, and thrust bearing means are provided for absorbing an axial thrust of the motor shaft or drive element that is centrifugally generated in response to rotation of the drum.

In accordance with another feature of this invention, the means for converting rotation of the motor shaft into the movements of the magnetic head means in the directions parallel to the drum axis includes a flexible metal belt having an intermediate loop wound about the motor shaft and coupled to the latter, with opposite ends of the flexible metal belt being fixed to the radially outer portion of the head support means.

In a preferred embodiment of the invention, the head support means includes a pair of flexible arm members extending substantially radially in respect to the central axis of the drum and being substantially parallel to each other and spaced apart in the direction of the drum axis, a support member by which radially inner parts of the arm members are fixed to the drum, and a bridge member connecting radially outer ends of the arm members, with the magnetic head means being mounted on such bridge member which is also connected to the ends of the flexible metal belt for converting the rotation of the motor shaft into the movements of the magnetic head means parallel with the drum axis.

The above, and other objects, features and advantages of the invention, will be apparent in the following detailed description of a preferred embodiment thereof which is to be read in connection with the accompanying drawings wherein the same reference numerals are employed for identifying the corresponding parts in the several views.

DETAILED DESCRIPTION OF A PREFERRED EMBODIMENT

Figure 1:
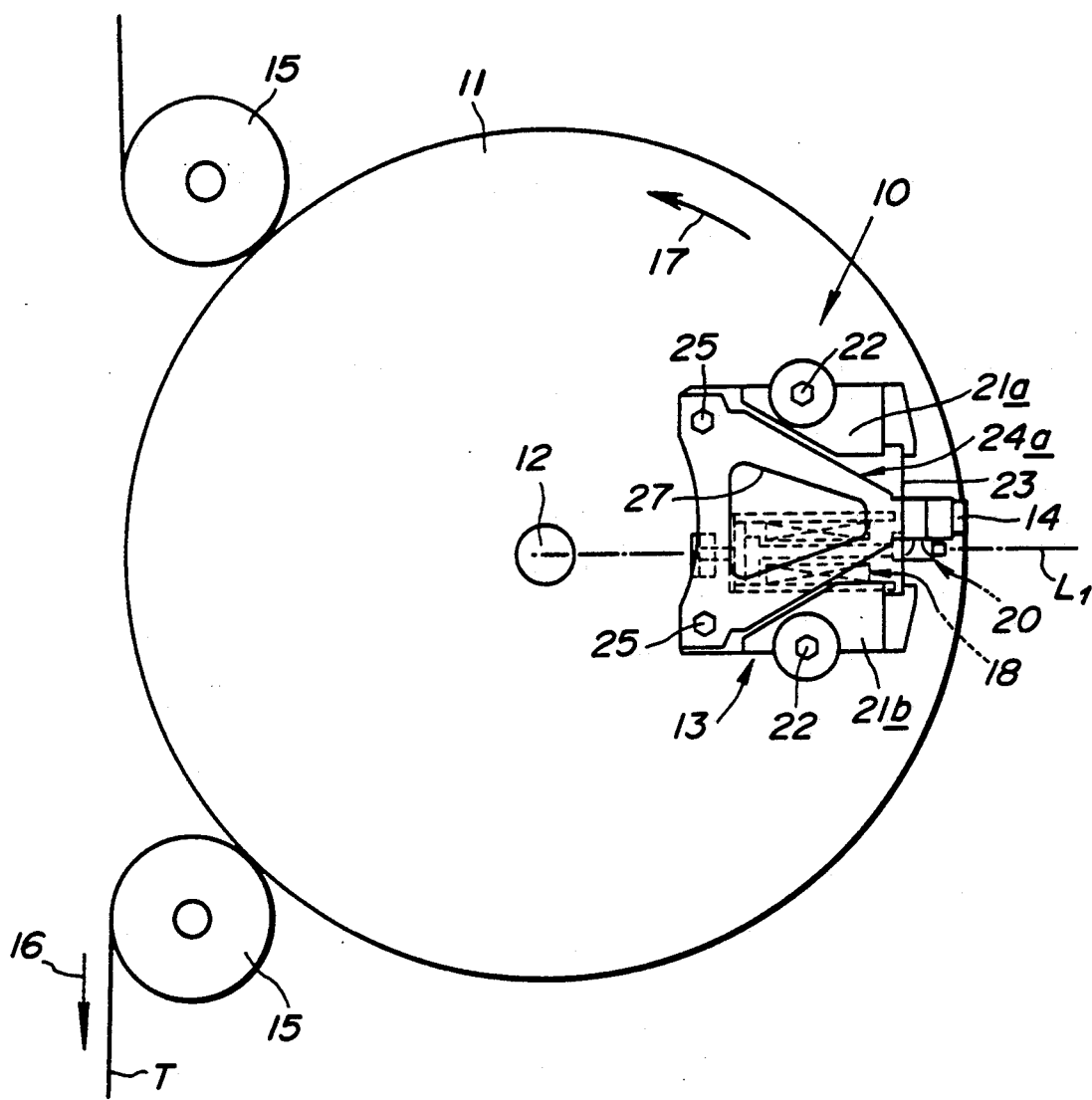
FIG. 1 is a top plan view of a tape guide drum of a VTR having a rotary head device in accordance with an embodiment of this invention mounted thereon.

Referring to the drawings in detail, and initially to FIG. 1 thereof, it will be seen that a rotary head device 10 in accordance with an embodiment of this invention is there shown associated with a tape guide drum 11 which is rotatable about the axis of a centrally located shaft 12. The device 10 is shown to generally comprise a head support mechanism 13 mounted on the rotary tape guide drum 11 and supporting a magnetic head or heads 14 for engagement of the latter with a magnetic recording tape T which is suitably guided or wrapped about the periphery of the guide drum 11, as by guide rollers 15. As is well known in helical scan video tape recorders, the tape T is helically wrapped on the drum 11, that is, the path of the tape about the periphery of the drum 11 is inclined relative to the plane of rotation of the head 14 with the drum so that, as the tape T is longitudinally advanced, for example, in the direction of the arrow 16 on FIG. 1 and the drum 11 is simultaneously rotated in the direction of the arrow 17, the magnetic head 14 will scan successive oblique recording tracks extending across the width of the tape T. It will be apparent that the angle between the longitudinal medium of the tape T and the path scanned by the head 14 in traversing the tape T depends upon the angle between the longitudinal medium of the tape wrapped about the drum 11 and the plane of rotation of the head 14 with the drum, and also on the rotational speed of the head 14 with the drum and the tape running speed. During normal reproducing or playback operations in which the tape T is advanced at the standard tape running speed used for recording, the scanning path of the head 14 will be parallel to the recording tracks extending obliquely across the tape so that a servo control, in regulating the speed of advance of the tape, can cause the rotary head 14 to accurately track the successive recording tracks. However, during slow-motion or fast-motion playback operations in which the tape running speed is either less than, or greater than the standard tape running speed, the scanning path of the rotary head 14, if the latter is fixed in the direction parallel to the axis of rotation of the drum 11, would be angularly displaced from the recording tracks on the tape T. Accordingly, in the rotary head device 10 according to this invention, the mechanism 13 supports the head 14 for movements of the latter in directions substantially parallel with the central axis of the drum 11, and the device 10 further comprises a rotary motor 18 (FIGS. 1 and 2) having a rotatable drive element or motor shaft 19 which is rotated in response to a control signal applied to the rotary motor 18, and a motion converting or transmission device 20 for converting rotation of the motor shaft 19 into movements of the magnetic head 14 in directions parallel to the axis of rotation of the drum 11.

Figure 2:
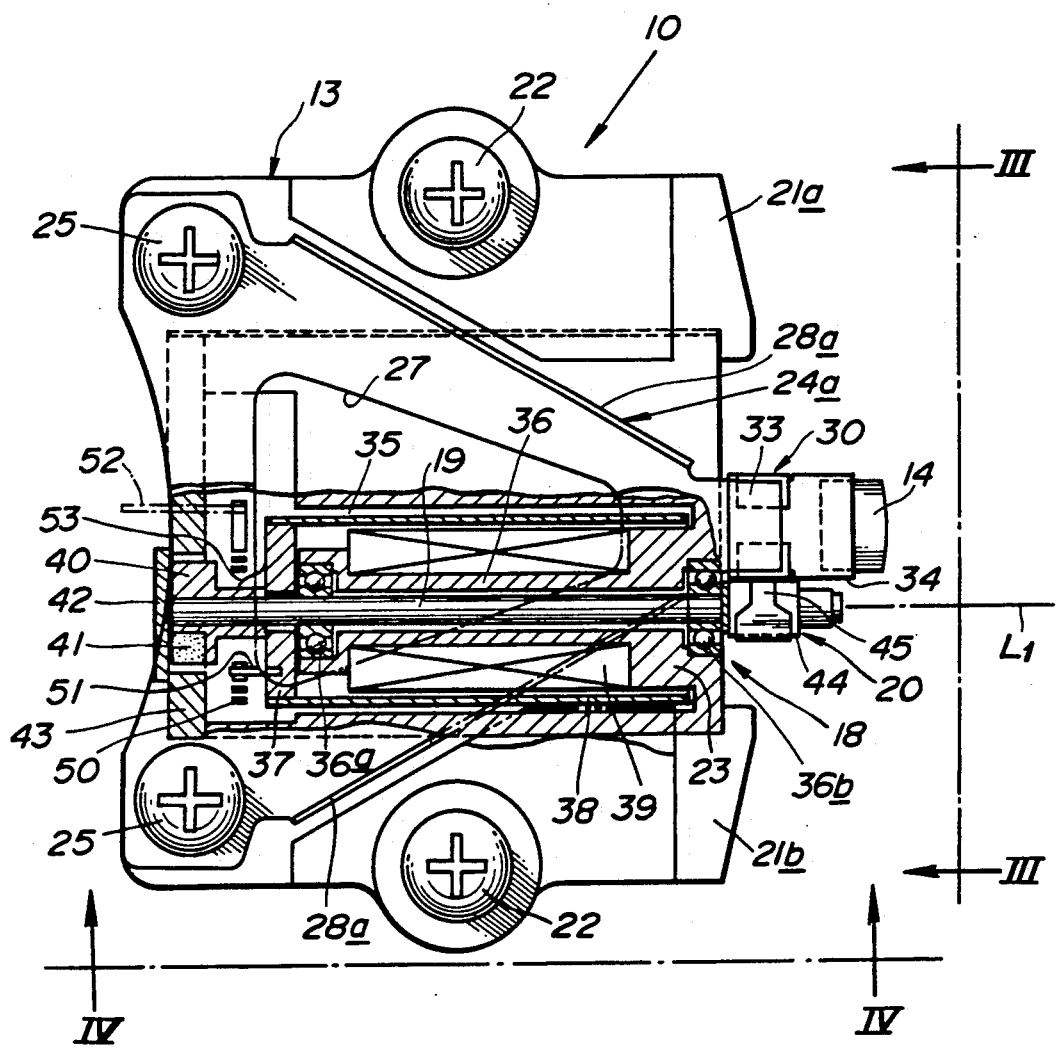
FIG. 2 is an enlarged top plan view of the rotary head device of FIG. 1, but shown partly broken away and in section for illustrating details of a rotary motor included therein.
Figure 3:
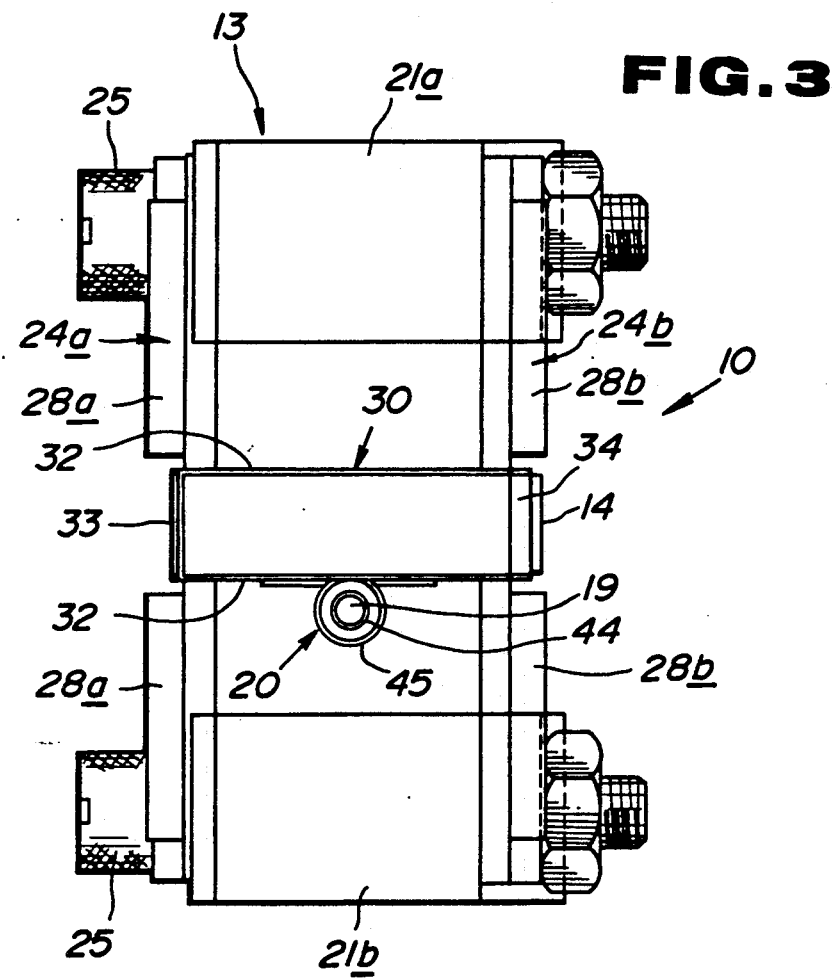
FIG. 3 is an end elevational view of the rotary head device, as viewed in the direction of the arrows III—III on FIG. 2.
Figure 4:
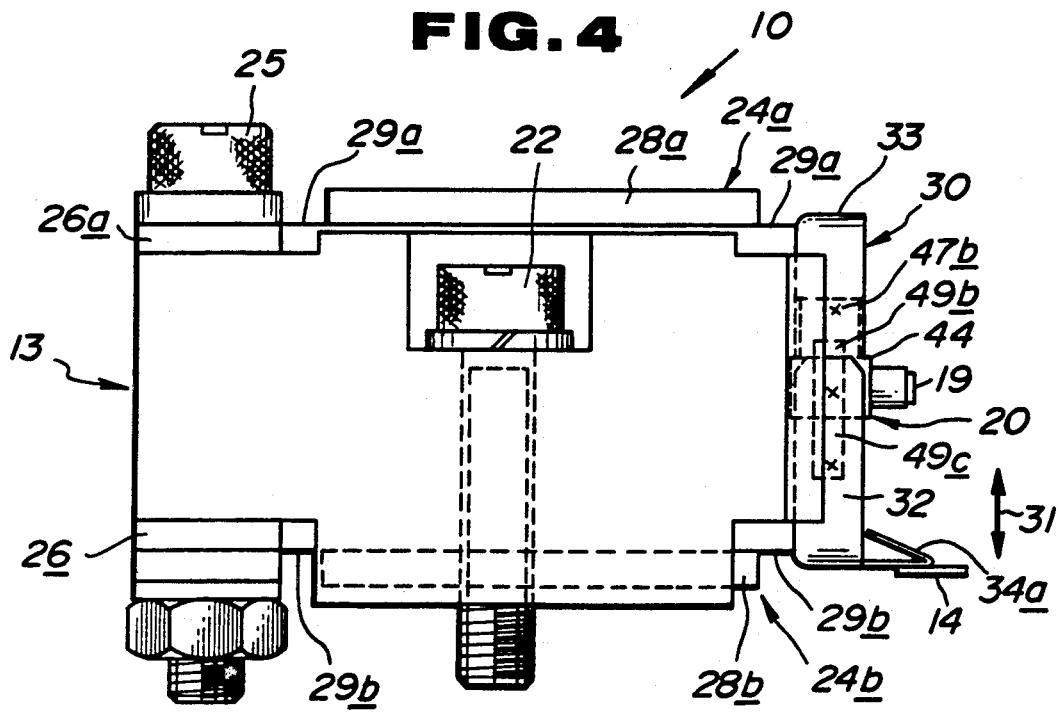
FIG. 4 is a side elevational view of the rotary head device, as viewed in the direction of the arrows IV—IV on FIG. 2.

As shown particularly on FIGS. 2, 3 and 4, the head support mechanism 13 desirably includes a pair of side support members 21a and 21b which are spaced apart laterally and secured to the drum 11, as by screws 22, and a housing 23 for the motor 18 extending between the side support members 21a and 21b and embraced thereby. The side support members 21a and 21b are shown on FIG. 1 to extend substantially parallel to a line $L_1$ therebetween which is directed radially outward from the axis of rotation of the drum 11. The head support mechanism 13 is further shown to comprise a pair of upper and lower arm members 24a and 24b desirably formed of resiliently flexible sheet metal, for example, having a thickness of about 0.05 mm, and each having the configuration approximately of an isosceles triangle with the base of such triangle directed radially inward in respect to the axis of rotation of the drum 11. The upper and lower arm members 24a and 24b are disposed above and below, respectively, the side support members 21a and 21b and are secured to the latter at radially inner parts of the arm members 24a and 24b, as by screws 25 extending through base corner portions of the triangular arm members 24a and 24b. Preferably, spacers 26a and 26b are interposed between the arm members 24a and 24b and top and bottom seating surfaces on the side support members and 21b, as shown on FIG. 4, for ensuring that the arm members 24a and 24b are free to flex angularly about their secured radially inner parts.

In order to reduce the mass of the arm members 24a and 24b, the latter may be formed with substantially triangular, centered cutouts 27 and, if desired, reinforcing flanges 28a and 28b may be provided along the opposite side edges of the arm members 24a and 24b, respectively. Such reinforcing flanges 28a and 28b desirably terminate short of the radially inner and outward portions of the respective arm members 24a and 24b so as to leave at least radially inner and outer flexible portions 29a and 29b (FIG. 4) at which the arm members 24a and 24b, respectively, are free to flex in parallel relation to each other.

Figure 5:
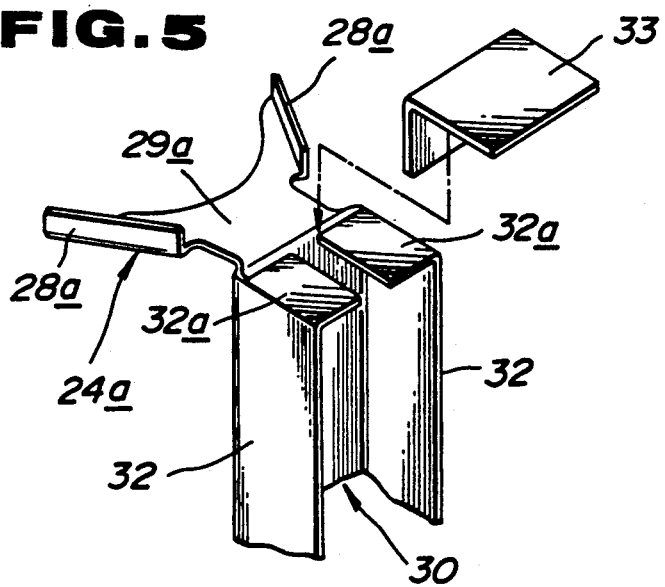
FIG. 5 is a fragmentary, exploded perspective view of a portion of a head support mechanism included in the rotary head device of FIGS. 1–4.

The head support mechanism 13 is completed by a bridge member 30 which extends between and connects the radially outer ends of the arm members 24a and 24b, and on which the head or heads 14 are suitably mounted. Thus, angular displacements of the arm members 24a and 24b about their radially inner parts secured to the side support members 21a and 21b are accompanied by movements of the bridge member 30 and of the head or heads 14 therewith in directions indicated by the double-headed arrow 31 on FIG. 4 and which are parallel to the axis of rotation of the drum 11. As shown particularly on FIG. 5, the bridge member 30 may be in the form of a channel welded, or otherwise secured, at the ends of its web, to the radially outer ends of the arm members 24a and 24b, and having side flanges 32 which are bent inwardly at their ends, as at 32a, to provide seats at which reinforcing angle members 33 and 34 can be welded or otherwise secured to the upper and lower ends, respectively, of the bridge member 30. Further, one of the reinforcing angle members 33 and 34, for example, the member 34 in the illustrated embodiment, is formed with a head mounting section 34a (FIG. 4) from which the magnetic head 14 projects.

It will be appreciated that the rotary motor 18 contained within the housing 23 is conveniently situated between the upper and lower arm members 24a and 24b, with the axis of rotation of the motor shaft 19 coinciding with the line $L_1$ which, as shown on FIG. 1, extends radially from the axis of rotation of the drum 11. The motor housing 23 is shown to have a cylindrical cavity 35 with a coaxial hollow stem 36 projecting centrally therein and through which the motor shaft 19 extends. Ball bearings 36a and 36b are provided within the radially inner portion of the hollow stem 36 and, in alignment with the latter, at the outer portion of the housing 23, respectively, for rotatably supporting the motor shaft 19 and for absorbing axial loads on the latter. A rotor coil base 37 is secured on the shaft 19 at the radially inner side of the ball bearing 36a, and a rotor coil 38 is provided on a hollow cylindrical bobbin or form which extends axially from the base 37 into the cylindrical cavity 35 so as to be disposed between the wall surface of the cavity 35 and an annular stator magnet 39 which is mounted on the stem 36. The radially inner end of the motor shaft 19 carries a magnet holder 40 which rotates with the shaft and contains a position indicating magnet 41 adapted to cooperate with a position sensor 42 mounted on an adjacent closure 43 of the motor housing 23.

Figure 7:
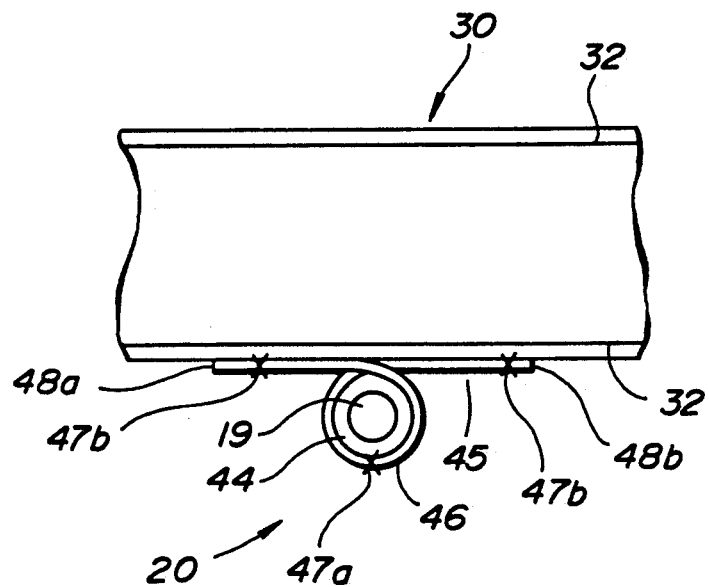
FIG. 7 is an enlarged, fragmentary end elevational view of a mechanism included in the rotary head device embodying this invention for converting rotation of a motor shaft into displacements of the magnetic head or heads in directions parallel to the drum axis.
Figure 8:
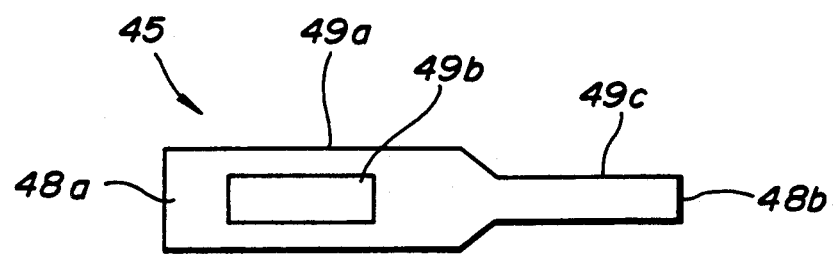
FIG. 8 is a plan view of a flexible metal belt included in the mechanism of FIG. 7.

The other or radially outer end portion of the motor shaft 19 projects from the motor housing 23 and has a metal pulley 44 with an outer diameter of, for example, about 1.6 mm, secured or formed integrally thereon so as to be disposed adjacent a side of the bridge member 30. The pulley 44 forms part of the device 20 for converting rotation of the motor shaft 19 into the movements of the magnetic head 14 in the directions parallel to the axis of rotation of the drum 11. Such device 20 is particularly shown on FIG. 7 to further include a flexible metal belt 45, preferably of thin steel with a small coefficient of thermal expansion, having an intermediate loop 46 wound about the pulley 44 on the shaft 19 and coupled to the latter, for example, by spot welding indicated at 47a, while opposite end portions 48a and 48b of the metal belt 45 are fixed to the radially outer portion of the head support mechanism 13, for example, by being spot welded as at 47b, to the adjacent side flange 32 of the channel-shaped bridge member 30. As particularly shown on FIG. 8, the flexible metal belt 45 may desirably include a relatively wide portion 49a having an aperture 49b therein and a relatively narrow portion 49c laterally dimensioned to permit the threading thereof through the aperture 49b for forming the intermediate loop 46 about the pulley 44. The belt 45 is desirably longitudinally tensioned, for example, with a tension of about 50g, after being looped about the pulley 44 and at the time of the spot welding of the ends of the belt to the bridge member 30.

It will be apparent that rotation of the pulley 44 by means of the motor 18 serves to angularly displace the position of the spot weld 47a about the axis of the motor shaft 19 with the result that the spot welds 47b connecting the ends of the belt 45 to the bridge member 30 are displaced in the direction along the latter and thereby convert rotation of the pulley 44 on shaft 19 into linear movement of the bridge member 30 with consequent flexing of the arm members 24a and 24b. If the outer diameter of the pulley 44 is about 1.6 mm, as described above, turning the motor shaft 19 and the pulley 44 thereon through ±60° serves to linearly move the bridge member 30 and the head or heads 14 thereon by ±0.83 mm in directions parallel to the axis of rotation of the drum 11. The described tension applied to the belt 45 when securing the latter to the bridge member 30 prevents any backlash in the conversion from the rotational movements of the shaft 19 to the linear movements of the head or heads 14, so that the latter can be moved accurately in accordance with control signals applied to the motor 18.

As shown on FIG. 2, a circuit through which a control signal may be supplied to the rotor coil 38 of the motor 18 includes a conductive hairspring 50 concentric with the motor shaft 19 within the motor housing 23 and being connected, at one end, to a terminal or pin 51 extending from the coil base 37 and being connected to one end of the coil 38. The opposite end of the conductive hairspring 50 is connected to an input terminal or lead 52 which projects through the enclosure 43 of the motor housing. The other end of the rotor coil 38 is connected by way of a lead wire 53 extending through the coil base 37 to the magnet holder 40 which is conductive, and from the magnet holder 40 the circuit is completed through the shaft 19, the pulley 44, the metal belt 45, the bridge member 30 and the arm members 24a and 24b to one of the fastening screws 25 which serves as the other terminal for supplying the control signal to the motor 18.

Figure 6:
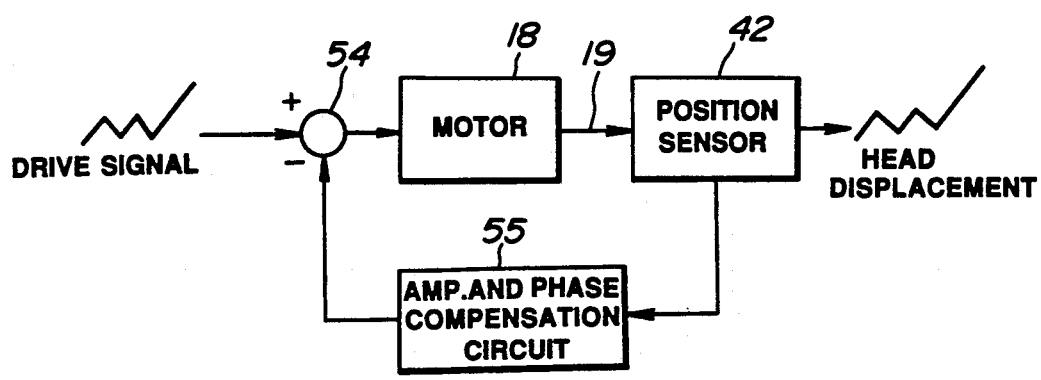
FIG. 6 is a schematic illustration of a control circuit that may be employed in association with the rotary head device embodying this invention.

Although forming no part of the present invention, a driving circuit for supplying a control signal to the motor 18 may include a suitable source of a drive signal for selectively causing the head 14 of the rotary head device 10 to effect so-called track jumping, wobbling or tracking, and an amplifying and phase compensating circuit 55 through which a signal from the position sensor 42 is fed back to a subtractor 54 for adjusting the drive signal as applied to the rotor coil 38 of the motor 18. Thus, the sensor 42 indicates to what extent the actual position of the motor shaft 19, and hence of the head 14, corresponds to that indicated by the drive signal whereupon subtractor 54 suitably adjusts the drive signal received by the motor 18 for achieving the desired displacements of the head 14 indicated schematically at on FIG. 6.

It will be appreciated that, in the above described rotary head device 10 according to this invention, the use of the conductive hairspring 50 in the control circuit for the rotary motor 18 eliminates the need for a brush or the like in supplying current to the rotor coil 38, and thereby avoids the wear or other problems usually associated with brush contacts.

Further, since the motor 18 is mounted with its shaft 19 and rotor coil 38 extending in the radial direction in respect to the axis of rotation of the drum 11, the relatively large centrifugal forces generated in response to rotation of the drum appear as an axial thrust of the shaft 19, and such axial thrust is well resisted or absorbed by the ball bearings 36a and 36b which support the shaft 19 in the fixed motor housing 23. Thus, the centrifugal forces resulting from the movable mass of the motor 18 do not at all influence or interfere with the flexing of the arm members 24a and 24b in response to the control signal applied to the rotor coil 38.

In the rotary motor 18, the stator magnet 39 and the rotor coil 38 are wholly contained within the motor housing 23 and are merely rotatable relative to each other about the axis of the shaft 19 so that the magnetic fields are well contained within the motor housing 23 to avoid influencing the operation of the magnetic head 14. Such housing 23 can be relatively small even though large displacements of the head 14 are achieved so that the housing 23 can be positioned between the arm members 24a and 24b and thereby desirably provide a relatively compact device 10.

By employing a rotary motor 18 and the device 20 for converting the rotation of the motor shaft 19 into movements of the bridge member 30 and head 14 in directions parallel to the axis of rotation of the drum 11, it is possible to control the position of the magnetic head with high precision while achieving relatively large movements or displacements of the head. Thus, the rotary head device 10 according to this invention can be used for recording, as well as for slow-motion or fast-motion playback, and such device is further adapted for inclusion in a professional use VTR or a digital VTR requiring relatively great ranges of head movement. It is also to be appreciated that the rotary head device 10 according to this invention requires relatively small driving voltages as compared with corresponding devices of the bimorph type.

Furthermore, in rotary head devices of the moving coil type, for example, as disclosed in U.S. Pat. No. 4,212,043 and in which the coil is directly connected to a movable support member for the magnetic head to be driven by the coil, the mass of the movable coil constitutes an inertia load which lowers the resonance frequency and thereby results in an undesirable frequency characteristic of the device. On the other hand, in the rotary head device 10 embodying this invention, the rotor coil 38 at which a torque is applied is radially spaced from the axis of the shaft 19 so that there is a mechanical advantage for the torque applied to the shaft 19 by the coil 38 with the result that the effective movable mass of the coil 38 can be reduced for increasing the resonance frequency of the mounting for the head 14.

It will also be appreciated that, when achieving relatively large movements or displacements of the head 14 by correspondingly large angular displacements of the coil 38, the rotary motor 18 of the rotary head device 10 does not undergo any reduction in the force available to cause such deflection or displacement. As contrasted therewith, when a linear motor is employed for effecting the head displacements, as in U.S. Pat. No. 4,212,043, increased displacement or deflection of the head requires an increased length of the coil, and such increased coil length reduces the force available to cause the deflection or displacement of the head. The foregoing, once again, reduces the resonance frequency of the head device provided with a linear motor.

Although a preferred embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. On a head drum rotatable about a central axis thereof, a rotary head device comprising:
    magnetic head means for recording and/or reproducing signals on a magnetic tape adjacent a peripheral surface of said head drum;
    head support means attached to said drum for supporting said magnetic head means for movement therewith in directions substantially parallel with said central axis;
    rotary motor means including a drive element rotatable about an axis of rotation extending radially outward with respect to said central axis of the drum, and means for rotating said drive element in response to a control signal applied to said rotary motor means;
    thrust bearing means for absorbing an axial thrust of said drive element resulting from rotation of said drum; and
    rotation converting means coupled with said drive element of said rotary motor means and with said head support means for converting rotation of said drive element into movement of said head support means and said magnetic head means therewith in said direction substantially parallel with said central axis of said head drum.

2. On a head drum rotatable about a central axis thereof, the rotary head device according to claim 1, in which said head support means includes a pair of flexible arm members extending substantially radially outward with respect to said central axis of the head drum and being substantially parallel to each other and spaced apart in the direction of said central axis, a support member by which adjacent parts of said arm members closest to said central axis are fixed to the head drum, and a bridge member connecting ends of said arm members remote from said central axis and on which said magnetic head means is mounted.

3. On a head drum rotatable about a central axis thereof, the rotary head device according to claim 2, in which said rotary motor means is disposed between said spaced apart arm members.

4. On a head drum rotatable about a central axis thereof, a rotary head device comprising:
    magnetic head means for recording and/or reproducing signals on a magnetic tape adjacent a peripheral surface of said head drum;
    head support means for supporting said magnetic head means for movement therewith in directions substantially parallel with said central axis, said head support means including a pair of flexible arm members extending substantially radially outward in respect to said control axis of the head drum and being substantially parallel to each other and spaced apart in the direction of said central axis, a support member by which parts of said arm members closest to said central axis are fixed to the head drum, and a bridge member connecting ends of said arm members remote from said central axis and on which said magnetic head means is mounted;
    rotary motor means disposed between said spaced apart arm members and including a motor shaft rotatable about an axis of rotation extending radially outward with respect to said central axis of the drum, and means for rotating said motor shaft in response to a control signal applied to said rotary motor means;
    thrust bearing means for absorbing an axial thrust of said motor shaft resulting from rotation of said drum; and
    rotation converting means including a flexible metal belt having an intermediate loop portion wound about said motor shaft so as to be driven by the latter and opposite end portions fixed to said bridge member for converting rotation of said motor shaft into movement of said head support means said magnetic head means therewith in said directions substantially parallel with said central axis of said head drum.

5. On a head drum rotatable about a central axis thereof, a rotary head device comprising:
    magnetic head means for recording and/or reproducing signals on a magnetic tape adjacent a peripheral surface of said head drum;
    head support means adjacent to the drum for supporting said magnetic head means for movement therewith in directions substantially parallel with said central axis, said head support means including first and second coupling means spaced apart in the direction of said central axis;
    rotary motor means including a rotatable motor shaft, and means for rotating said motor shaft about an axis of rotation in response to a control signal applied to said rotary motor means, the axis of rotation of said motor shaft extending radially outward with respect to said central axis of the drum; and
    rotation converting means including a flexible metal belt having an intermediate loop wound about said shaft and coupled to the latter and means securing opposite ends of said belt to said first and second coupling means spaced apart on said head support means in the direction of said central axis of the drum for converting rotation of said motor shaft into movement of said head support means and said magnetic head means therewith in said directions substantially parallel with said central axis of said head drum.

6. On a head drum rotatable about a central axis thereof, a rotary head device comprising:

magnetic head means for recording and/or reproducing signals on a magnetic tape adjacent a peripheral surface of said head drum;

head support means including a pair of flexible arm members extending substantially radially outward with respect to said central axis of the head drum and being substantially parallel to each other and spaced apart in a direction parallel with said central axis, a support member by which inner parts of said arm members disposed relatively closer to said central axis are fixed to the head drum, and a bridge member connecting outer ends of said arm members directed away from said central axis and on which said magnetic head means are mounted for movement therewith in directions substantially parallel with said central axis;

rotary motor means including a rotatable motor shaft extending radially outward with respect to said central axis, and means for rotating said motor shaft in response to a control signal applied to said rotary motor means; and rotation converting means coupled with said motor shaft of said rotary motor means and with said head support means for converting rotation of said motor shaft into movement of said head support means and said magnetic head means therewith in said directions substantially parallel with said central axis of said head drum.

7. On a head drum rotatable about a central axis thereof, the rotary head device according to claim 6, in which said rotary motor means is disposed between said spaced apart arm members.

8. On a head drum rotatable about a central axis thereof, the rotary head device according to claim 7, in which said rotation converting means comprises a flexible metal belt having an intermediate loop wound about said shaft and coupled to the latter and opposite end portions thereof fixed to said bridge member.

9. On a head drum rotatable about a central axis thereof, the rotary head device according to claim 5, in which said flexible metal belt includes a relatively wide portion having an aperture therein and a relatively narrow portion threaded through said aperture for forming said intermediate loop.

10. On a head drum rotatable about a central axis thereof, a rotary head device comprising:

magnetic head means for recording and/or reproducing signals on a magnetic tape adjacent a peripheral surface of said head drum;

head support means for supporting said magnetic head means for movement therewith in directions substantially parallel with said central axis, said head support means being electrically conductive and including first and second coupling means spaced apart in the direction of said central axis of the head drum;

rotary motor means including a rotable motor shaft, a motor housing fixed relative to the head drum, a stator magnet within said motor housing and shielded by the latter, bearing means rotatably supporting said motor shaft in said housing, and a rotor coil fixed on said shaft and cooperating with said stator magnet for driving said motor shaft in response to the supplying of a control signal to said rotor coil;

rotation converting means including a flexible metal belt having an intermediate loop wound about said motor shaft and coupled to the latter, and means securing opposite ends of said belt to said first and second coupling means for said head support means for converting rotation of said motor shaft into movement of said head support means and said magnetic head means in said directions substantially parallel with said central axis; and circuit means for supplying said control signal to said coil including a first terminal extending from said motor housing, a conductive hairspring concentric with said motor shaft and connected at opposite ends thereof with said first terminal and a first end of said rotor coil, respectively, means conductively connecting a second end of said rotor coil to said motor shaft and, through the latter and said flexible metal belt, to said head support means, and a second terminal by which said head support means is, at least in part, mounted on the head drum.

* * * * *